(12) United States Patent
Metsker et al.

(10) Patent No.: US 7,589,435 B2
(45) Date of Patent: Sep. 15, 2009

(54) REPORTING POWER REQUIREMENTS OF A POWERED DEVICE

(75) Inventors: Corey Metsker, Clinton, OH (US); James Amos, North Canton, OH (US); Edward Wright, Midlefield, OH (US); Chad Jones, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 385 days.

(21) Appl. No.: 11/609,515

(22) Filed: Dec. 12, 2006

(65) Prior Publication Data

US 2008/0030185 A1 Feb. 7, 2008

Related U.S. Application Data

(60) Provisional application No. 60/821,207, filed on Aug. 2, 2006.

(51) Int. Cl.
*H02J 3/06* (2006.01)
(52) U.S. Cl. .......................... 307/32; 700/291
(58) Field of Classification Search ................ 307/32, 307/34, 147; 713/300, 320; 700/286, 291
See application file for complete search history.

(56) References Cited

U.S. PATENT DOCUMENTS

| | | | | |
|---|---|---|---|---|
| 5,652,893 | A * | 7/1997 | Ben-Meir et al. | 713/310 |
| 6,448,672 | B1 * | 9/2002 | Voegeli et al. | 307/52 |
| 6,784,568 | B2 * | 8/2004 | Powers | 307/66 |
| 7,272,669 | B2 * | 9/2007 | Mattur et al. | 710/16 |
| 7,372,914 | B2 * | 5/2008 | Calvin | 375/272 |
| 7,460,930 | B1 * | 12/2008 | Howell et al. | 700/295 |
| 2004/0201931 | A1 | 10/2004 | Korcharz et al. | |
| 2004/0260794 | A1 | 12/2004 | Ferentz et al. | |
| 2006/0171399 | A1 | 8/2006 | Ferentz et al. | |

OTHER PUBLICATIONS

PoE IEE 802.3af White Paper, Power over Ethernet Solutions, http://www.cisco.com/en/US/netsol/ns340/ns394/ns147/ns412/networ . . . .

* cited by examiner

*Primary Examiner*—Albert W Paladini
(74) *Attorney, Agent, or Firm*—Tucker Ellis & West LLP

(57) ABSTRACT

In one embodiment, a powered device is configured to determine module population and the appropriate power requirements for installed modules. The power requirements can be communicated to the power sourcing equipment for the powered device. Optionally, the powered device can receive data representative of available power from the power sourcing equipment and the powered device is responsive to operate accordingly.

14 Claims, 5 Drawing Sheets

REPORTING POWER REQUIREMENTS OF A POWERED DEVICE

This application claims the benefit of priority of U.S. Provisional Application No. 60/821,207 filed Aug. 2, 2006.

BACKGROUND

The Institute of Electrical and Electronic Engineering (IEEE) 8002.3af standard 802.3af-2003 allows a PD (Powered Device) to report power requirements and request to be powered at that level through the classification protocol. Future standard 802.3at will provide for much higher power to be delivered as well as much more granularity on power required requests. Standard integrated 802.3af-compliant PD devices are typically hard-coded to report a fixed power requirement through classification. It is expected that integrated 802.3at devices will work under the same premise of assuming a fixed power classification level.

In a modular PD system, a fixed classification reporting is not appropriate. Required power can vary greatly between sub-modules (e.g., radios for access point systems). However, a dynamic classification request based on module population is complicated by several factors. For example, the 802.3af/at classification hardware must determine module power requirements—classification circuitry is on the Ethernet line side and modules are located on isolated side of primary power supply. In addition, 802.3af/at classification hardware must present appropriate classification signature based upon module population. Another problem is that the 802.3af/at classification hardware communicates to an isolated side main system controller what level of power is available. For example whether the Power Sourcing Equipment "PSE" switch is 802.3af or 802.3at compliant, or what level of 802.3at power the PSE can supply. When the host controller knows the power available from the PSE, the host controller can enable/disable appropriate modules, or operate the modules in a mode to insure that PSE power capabilities are not exceeded.

OVERVIEW OF EXAMPLE EMBODIMENTS

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an example embodiment, there is described herein an apparatus comprising a line side configured to receive power from an external power source, an isolated side configured to provide power to an installed module, and an isolation barrier between the line side and the isolated side to provide isolation between the line side and isolated side. A circuit on the line side is configured to send a first signal across the isolation barrier to the isolated side. The circuit is configured to determine a power requirement for the installed module based upon a response to the first signal. The circuit is responsive to determining the power requirement for the installed module to send a second signal to the external power source; the second signal comprises data representative of the power requirement.

In an example embodiment, there is described herein a method comprising receiving power from an external device. The method further comprises determining power requirements for installed modules separated from the external device by an isolation barrier, and communicating the power requirements for the powered device to an external power.

In an example embodiment, there is described herein an apparatus, comprising means for receiving power from an external power source. The apparatus further comprises means for determining a power requirements for at least one installed module separated from the external power source by an isolation barrier, and means for communicating the power requirements for the at least one installed module to the external device.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serve to explain the principles of the invention.

DESCRIPTION OF EXAMPLE EMBODIMENTS

Figure 1:
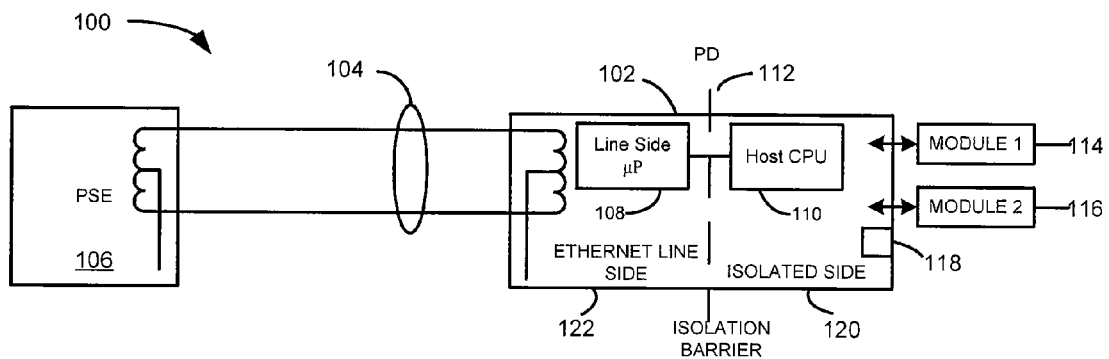
FIG. 1 is a block diagram of a powered device receiving power from a Power Sourcing Equipment.

Throughout this description, the examples shown should be considered as examples, rather than limitations, of the present invention. The figures generally indicate the features of the examples, where it is understood and appreciated that like reference numerals are used to refer to like elements.

Described herein is a powered device (PD) with the capability to determine the power requirements of installed modules and the capability to communicate the power requirements of the powered device to associated Power Sourcing Equipment (PSE). Although the powered device described herein described a powered device receiving power via Power over Ethernet (PoE), those skilled in the art should readily appreciate that this exemplary description is for merely for ease of illustration and that the aspects of the device described herein are suitably adaptable to any powered device.

The powered device employs a microcontroller on the Ethernet line side of an isolation barrier that determines module population and appropriate power requirements as described herein. For Power over Ethernet embodiments, the powered device can maintain 2 KV isolation.

Referring to FIG. 1, there is illustrated an example embodiment 100 of a Powered Device (PD) 102 receiving power via Power over Ethernet (PoE) 104 from Power Sourcing Equipment (PSE) 106. Line Side 122 of Powered Device 102 comprises a Line Side microprocessor (uP) 108 and isolated side 120 comprises a host central processing unit (CPU) 110. Modules, MODULE 1 114, MODULE 2 116 receive power from powered device 102 and are configured to be coupled to Line Side 120 of powered device 102. Powered device 102 may have one of more empty slots 118. In operation, after bootup, the line side controller 108 will identify the power levels of modules (e.g. MODULE 1 114 and MODULE 2 116) coupled to powered device 102. This enables the appropriate power levels to be requested.

For example, if powered device is an access point (AP) and modules module 1 114 and module 2 116 are radio modules, the AP can request the appropriate power level using 802.3af classification. From entry to classification phase, the controller boots, identifies the radio module power levels, and presents the appropriate 802.3af classification load. In an 802.3af compliant system these actions are performed within 5 ms.

Figure 2:
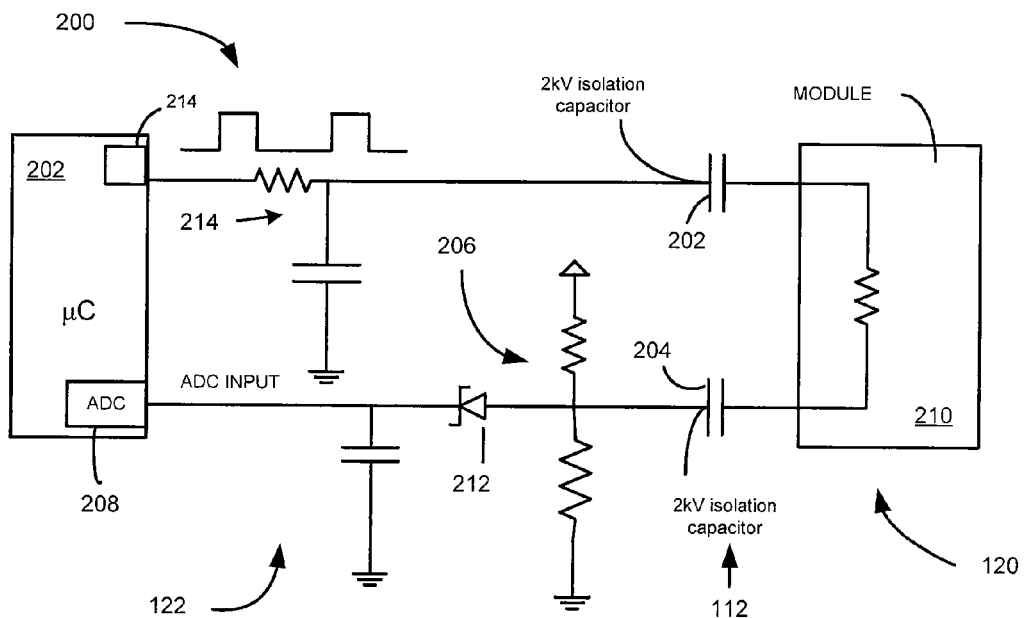
FIG. 2 is a simplified schematic diagram for detecting an installed module by a powered device.

FIG. 2 is a schematic diagram of a circuit 200 for detecting an installed module (or modules) by a powered device. To identify radio modules, a square-wave (e.g. 100 KHz) is generated by signal generator 214 controlled by microprocessor 202. For example, at 100 KHz, using 0.001 uF, 2 kV isolation capacitors 202, 204 present an impedance of ~1.6 Kohms each, which can be negligible by selecting the appropriate resistances for the voltage divider 206. An ADC 208 at the other end of circuit 200 will receive the response to the square wave. ADC 208 can be read to determine the power required by each module 210. (e.g. modules 114, 116 in FIG. 1) Module 210's resistance affects the voltage on ADC 208 enabling, microcontroller 202 to determine the appropriate power level for module 210. Table 1 below provides an example of module resistances correlated to radio power.

TABLE 1

| Resistance on Radio Module | Voltage Range On ADC | Power Level of Radio | Radio Power |
|---|---|---|---|
| Infinite | <1.5 V | No radio module | N/A |
| 100 Kohms | 1.5-2.0 V | Low Power | 3.0 W max |
| 24.9 Kohms | 2.0-2.5 V | Medium Power | 4.5 W max |
| 1 Kohms | 2.5-3.0 V | High Power | 6.0 W max |

Note that Low Power radios present 100 Kohms (Low Power) resistance. In general, any add-on module can present parallel resistance to identify a higher power level.

The basic equations of the above circuit are:

$$V(at\text{-}ADC) = 1.5 + V(p\text{-}p)/2 - V(diode) \quad \text{Equation 1:}$$

Where:
V(p-p) is peak-to-peak voltage at anode of diode 212
V(diode) is the voltage drop across diode 212
Voltage across 206 in the example of FIG. 2 is 3.0V $$V(p\text{-}p) = V(out) * (50K/(50K + R(radio))) \quad \text{Equation 2:}$$

Where:
R(radio) is resistance on radio module 210
R (206) in the example of FIG. 2 is 100 Kohms each for 50K ohms parallel impedance
V(out) is p-p output voltage of square-wave generated from uC 202

Employing a schotkey diode for diode 212 can provide a low and predictable V(diode). An RC filter 214 can be utilized to remove most of the high frequency content of the 100 KHz squarewave to approximate a 100 KHz sinewave output. The 2 kV isolation capacitors 202, 204 maintain isolation between the installed module 210 and the line side microcontroller 202.

Figure 3:
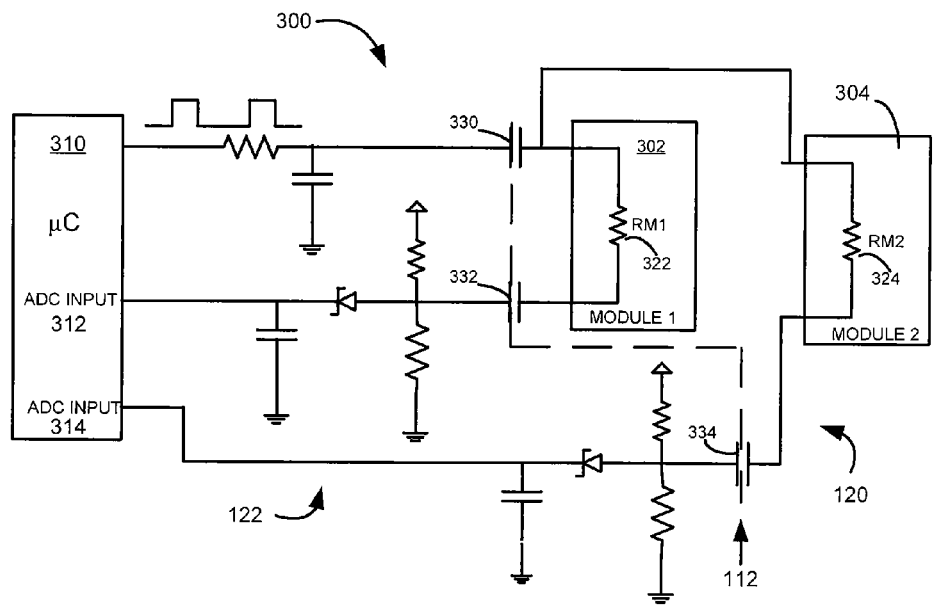
FIG. 3 is a simplified schematic diagram for detecting a plurality of installed modules by a powered device.

FIG. 3 is a simplified schematic diagram of a circuit 300 for detecting a plurality of installed modules 302, 304 by a powered device. A feature of circuit 300 of FIG. 3 is that each module has its own ADC input 312, 314, and therefore module resistances RM1 322, RM2 324 can be any value (e.g., they can be the same value or different values). For example if module 1 302 is a high power radio and module 2 304 is a medium power radio, then RM1 322 can be approximately 1 K ohms (and the associated ADC 312 would read approximately 2.5-3.0V) and RM2 324 can be 24.9K ohms (and the associated ADC 314 would read approximately 2.0-2.5V). Microprocessor 310 generates a square wave signal. The signal is communicated to modules 302, 304 through isolation capacitor 330. Capacitors 332, 334 are coupled to modules 302, 304 respectively for providing the response to the square wave signal to the corresponding ADC inputs, 312 and 314 respectively, of microprocessor 310. As illustrated in FIG. 3, each module 302, 304 has a corresponding ADC input 312, 314 respectively for measuring the response.

Figure 4:
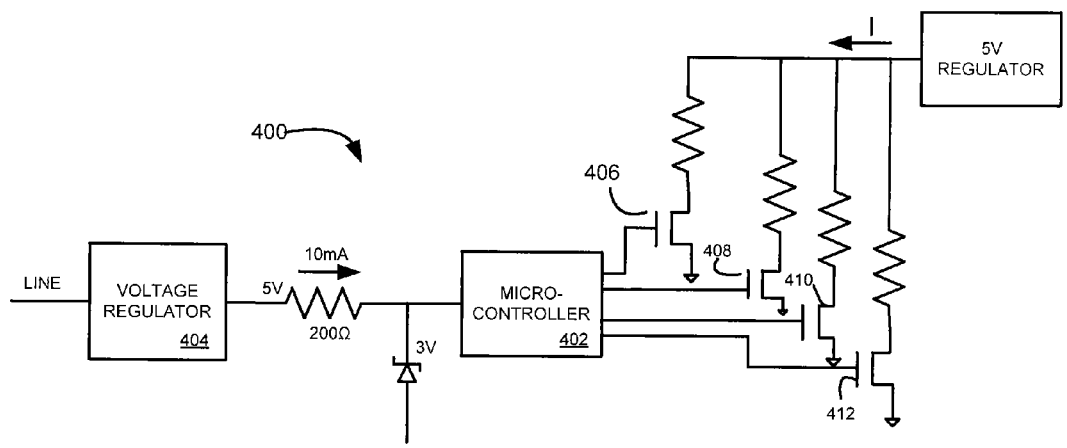
FIG. 4 is a schematic diagram of a circuit for communicating power requirements of a powered device.

FIG. 4 is a schematic diagram of a circuit 400 for communicating power requirements of a powered device. For example, the line side Ethernet controller 402 of a PD can use this technique to communicate the power requirements to a PSE (not shown). The PSE determines the power requirements based on the current consumed during a predetermined time period.

In operation, line power is received by a voltage regulator 404, which outputs a voltage (as shown 5V for this example). The voltage reference regulates at 3V, so a 2V voltage drop is observed over the 200 ohm resistance, resulting in a 10 mA current to microcontroller 402. This 10 mA regulated current corresponds to 802.3af Class1. Microcontroller 402 optionally switches on the appropriate transistor (or transistors) selected from the group consisting of transistors 406, 408, 410, 412 to set the appropriate classification current of the powered device. When a voltage is applied, a current I flows through the resistor coupled to a transistor 406, 408, 410, 412 that is turned on, enabling the PSE determine the power requirements of the powered device. The combination of 10 mA to reference/microcontroller 402 and current through enabled switch can present other classification levels such as 802.3af Class 2-4.

Figure 5:
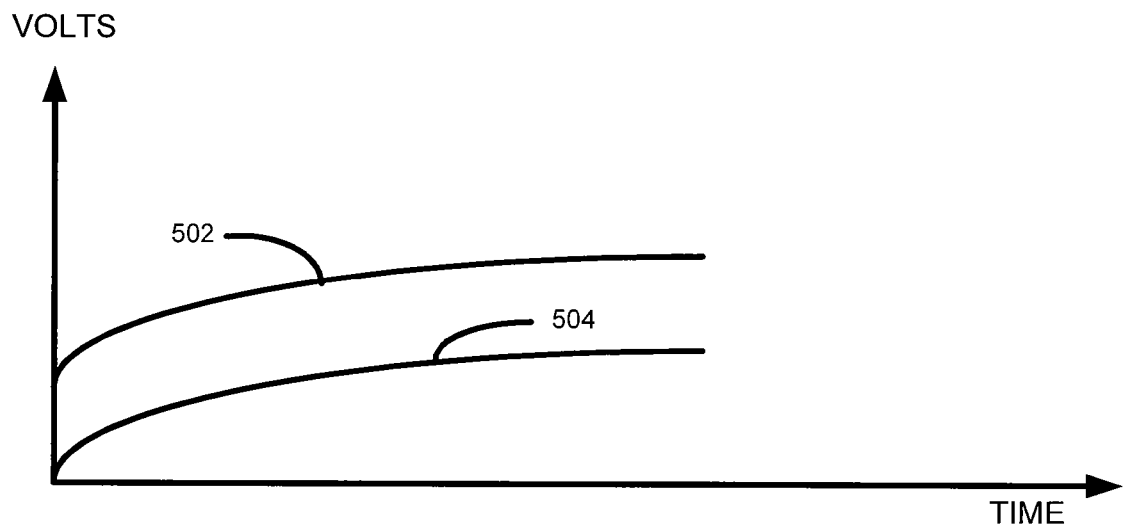
FIG. 5 is an example signal diagram for determining power requirements of installed modules.

FIG. 5 is an example signal diagram for determining power requirements of installed modules. The signal diagram can be generated employing a circuit configured similar to FIG. 3. Input 502 is an example response for a medium power radio employing a 24.9K resistor and input 504 is a response for a low power radio with 100K ohms resistance. In an example embodiment, the settling time to a stable value is approximately 400 us from the time 100 KHz waveform is applied.

Figure 6:
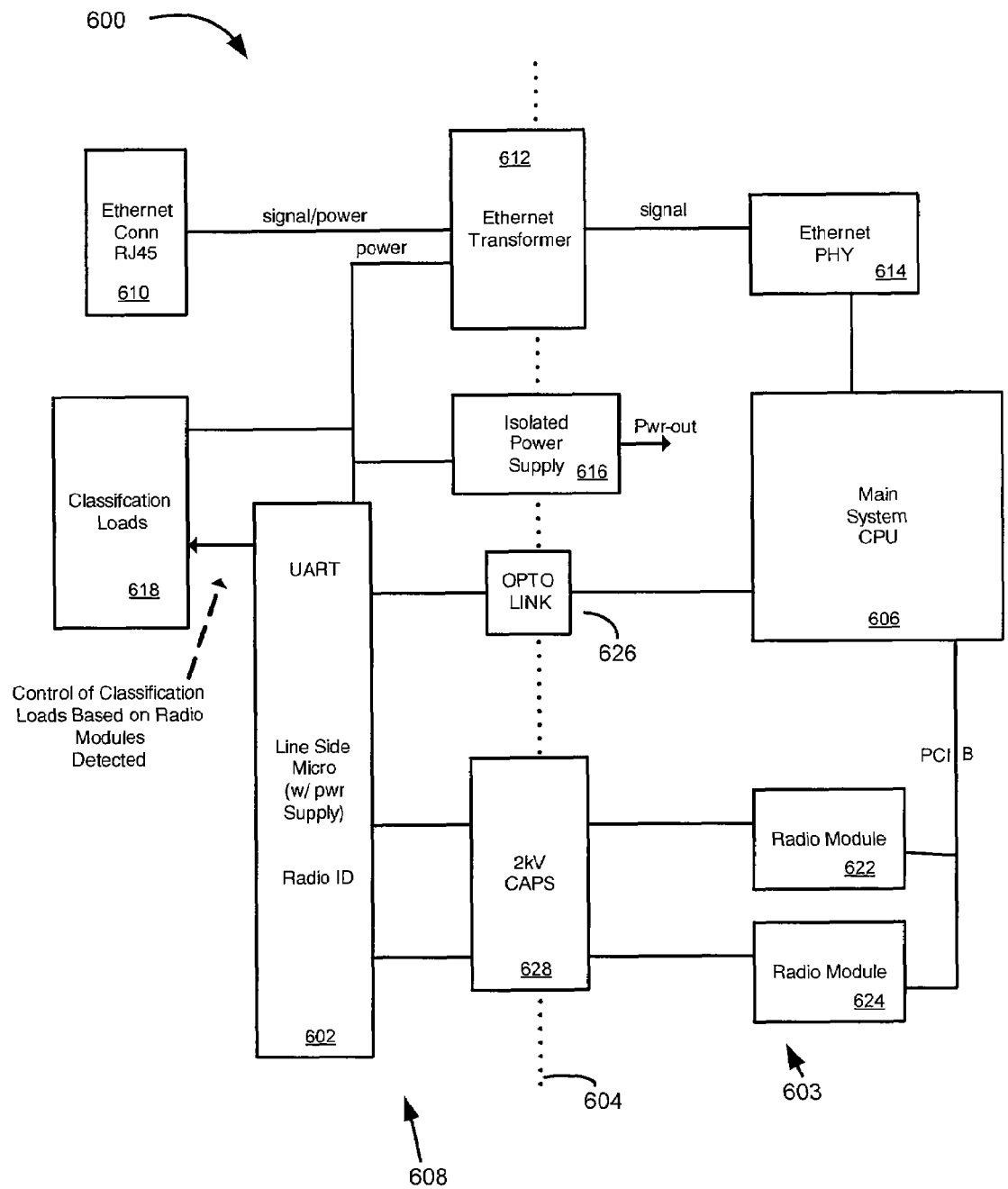
FIG. 6 is a detailed block diagram of a powered device.

FIG. 6 is a detailed block diagram of a powered device 600 configured to receive data and power over Ethernet. Powered device 600 comprises a line side 608, isolation barrier 604 for isolating line side 608 from isolated side 603. Powered device 600 also comprises an Ethernet Line side microcontroller 602 (left of the 2 kV isolation barrier 604) and a host side controller 606 at the isolated side 603, which are isolated from each other by isolation barrier 604.

The Ethernet side 608 of powered device 600 comprises an Ethernet connection 610 (e.g. an RJ45) that receives data (signal) and power. An Ethernet transformer 612 passes the data (signal) to an Ethernet physical layer processor (PHY) 614 on the isolated side 603, and power to the isolated power supply 616 and line side microcontroller 602 as well as to a load classification (Classification Loads) module 618.

Isolated power supply 616 provides power to the components on the isolated (host) side 603 of powered device 600 (e.g. the main system CPU 606, radio modules 622, 624, Ethernet PHY 614, etc.). An opto link 626, an example of which will be described in more detail herein (see FIG. 7), couples the main (host) system CPU 606 to the line side microcontroller 602. Opto link 626 enables the main system CPU 606 and line side microcontroller 602 to communicate with each other, while providing the appropriate isolation.

Radio modules 622, 624 are illustrated as being coupled to main system CPU 606 via a PCI bus. However, any suitable bus can be employed for coupling the main system CPU to the radio modules. The 2 kV capacitors 628 coupling radio modules 622, 624 to the line side micro processor 602 providing isolation between line side microprocessor 602 and Main (Host) System CPU 606.

When line side microcontroller 602 determines the power requirements of the radio modules 622, 624 associated with powered device 600, line side microcontroller 602 controls the load classification module 618 to communicate the power requirements to an associated PSE (not shown).

The PSE can communicate its capabilities to the line side microcontroller 602. Using opto link 626, microcontroller 602 on Ethernet line side 608 of isolation barrier 604 communicates to main system controller 606 across 2 kV isolation barrier 604. PSE capabilities are reported to host controller (main system CPU 606) by microcontroller 602 so that host controller 606 can configure the appropriate modules (e.g. modules can be enabled/disabled or operated in the appropriate mode) to achieve the required power consumption.

Figure 7:
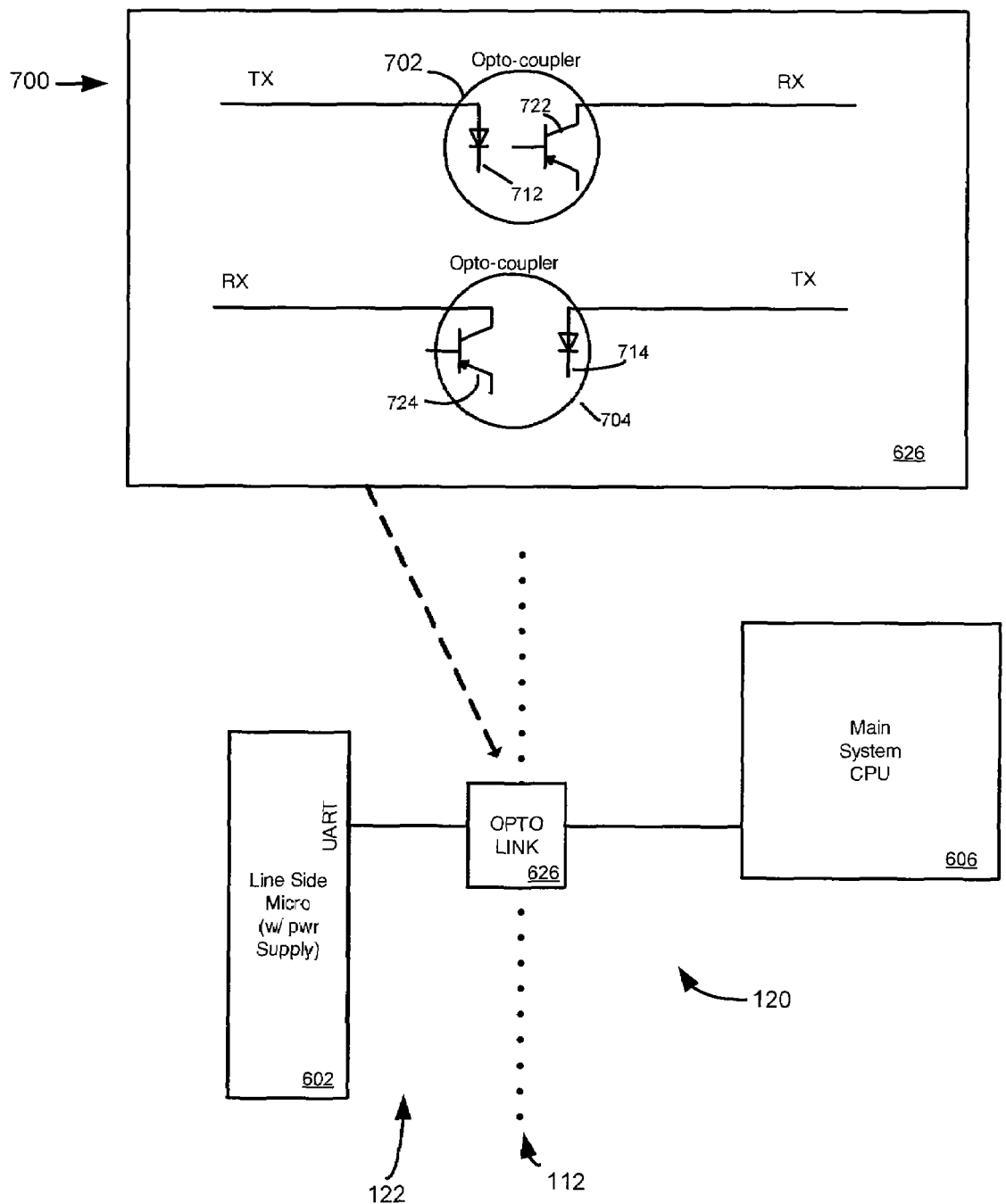
FIG. 7 is a detailed schematic diagram of an optical link employed by the powered device in FIG. 6.

Full-duplex asynchronous serial communication from the line side microprocessor 602 to the host processor 606 is accomplished through opto-coupler 626 link for 2 KV isolation. Data transferred includes, but is not limited to:

Line Side Controller Microcode Update
Read of Power requested (and granted) through 802.3 Classification
Command from host to enable active limiting of input power
Command from host to update firmware
Command from Host to ID Power Source which may include AC-to DC brick, DC-to-DC brick, battery, 802.3af/at compliant device, or custom power-over-Ethernet powering equipment such as proprietary mid-span injector
Identification of Line Side Controller Firmware Version—checked on each boot to see if firmware update is necessary FIG. 7 is a detailed schematic diagram 700 of an optical link 626 employed by the powered device in FIG. 6. Optical link 626 comprises two opto couplers 702, 704. One for transmitting signals from the host CPU 606 to the Ethernet line side controller 602, and the other for transmitting signals from the Ethernet line side controller 602 to the host CPU 606. Each opto-coupler 702, 704 comprises a LED 712, 714 and a phototransistor 722, 724.

In an example embodiment, both diode 712, 714 emitters are biased for a current of 5 mA when ON and both detectors run from 5V. Using known diodes with a load resistance of 500 ohms the response time for a worst case scenario is about 10 us with CTR=200%—thus 10 mA current flows through an ON detector. If is allowing for a doubling of that response time to 20 us (to allow for time and temperature effects and provide design margin), then a 4800 baud link is possible.

Note that a known regulator can supply 10 mA on 5V reference output. The communication link is full-duplex and with both line-side TX diode emitter ON and RX detector ON, maximum current consumption from 5V is 15 mA. In an example embodiment, both the line side microcontroller 602 and the host CPU 606 keep the TX signal at logic HIGH when there is no communication (IDLE). To avoid high power consumption in opto-coupler circuit 626, logic has been designed to turn both opto-couplers OFF when in IDLE state.

Figure 8:
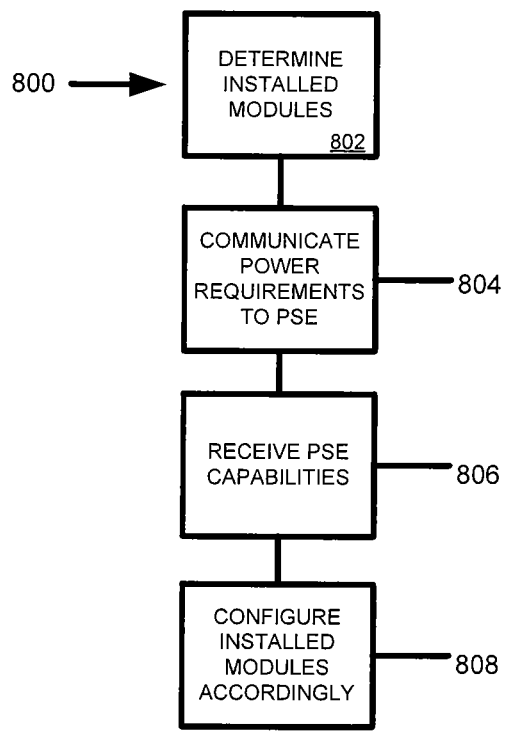
FIG. 8 illustrates an example of a methodology for reporting power requirements of a powered device

In view of the foregoing structural and functional features described above, a methodology in accordance with various aspects of the present invention will be better appreciated with reference to FIG. 8. While, for purposes of simplicity of explanation, the methodology 800 of FIG. 8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

At 802, methodology 800 determines the installed modules, and/or the power requirements of the installed modules. This can occur shortly after bootup. The circuits 200, 300 described in FIGS. 2 and 3 can be employed for determining the installed modules. These circuits can generate a signal and based on the response to the signal determine the resistance of the installed module using simple resistor divider calculations as described herein.

At 804, the power requirements for the PD are communicated to the PSE. An example system 400 for performing this function in a PoE environment is illustrated in FIG. 4. For example, in FIG. 4, a resistance is set to communicate the power requirements. One or more of Transistors 406, 408, 410, 412 are turned on to select a desired resistance. For 802.3af compliant devices, 802 and 804 must be is completed within 5 ms.

At 806, the line side microprocessor receives the PSE capabilities from the PSE. In an example embodiment, a tone can be employed by the PSE to communicate the PSE's capabilities to a line side microprocessor. The line side microprocessor can communicate the PSE's capabilities to a host CPU using an opto link circuit such as was described herein in FIGS. 6 and 7.

At 808, the host CPU configures the installed modules according to the PSE requirements. For example, if the PSE has sufficient available power, all modules can be implemented at full power. However, if the PSE has insufficient available power, the host CPU can disable one or more modules. Alternatively, if the PSE has insufficient available power, the host CPU can configure one or more of the modules to operate in a lower power mode (e.g. radio modules can be configured to transmit at a lower power).

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a line side configured to receive power from an external power source;
a circuit on the line side configured to send a first signal to at least one installed module the circuit comprising an analog to digital converter for receiving the response to the first signal;
an isolated side isolated from the line side, wherein the at least one module is located at the isolated side;
an isolation barrier between the line side and the isolated side to provide isolation between the line side and isolated side;
wherein the circuit on the line side is configured to send the first signal across the isolation barrier to the isolated side;
wherein the circuit is configured to determine a power requirement for the at least one installed module based upon a response to the first signal; and
wherein the circuit is responsive to determining the power requirement for the at least one installed module to send a second signal to the external power source, the second signal comprises data representative of the power requirement.

2. An apparatus according to claim 1, the first circuit further comprises a voltage divider for receiving the response to the first signal coupled between the isolation barrier and the analog to digital converter.

3. An apparatus according to claim 2, the first circuit comprises a diode coupled between the voltage divider and the analog to digital converter.

4. An apparatus according to claim 3, wherein the diode is a schotkey diode.

5. An apparatus according to claim 4, the isolation barrier comprises first and second capacitors, the first capacitor coupled to the installed module for providing the first signal to the installed module, the second capacitor coupled between the installed module and the voltage divider.

6. An apparatus according to claim 1, the installed module further comprises a plurality of installed modules.

7. An apparatus according to claim 6, the isolation barrier comprises a plurality of capacitors corresponding to the plurality of installed modules, coupled between the first circuit and the plurality of installed modules for providing the response of the plurality of modules to the first circuit.

8. An apparatus according to claim 7, wherein the first circuit is configured to determine the power requirement for each of the plurality of installed modules individually.

9. An apparatus according to claim 8, the first circuit further comprises a plurality of analog to digital converts corresponding to the plurality of installed modules for determining the response to the signal from each of the plurality of installed modules individually.

10. An apparatus, comprising:
means for receiving power from an external power source;
means for determining a power requirements for at least one installed module separated from the external power source by an isolation barrier;
means for communicating the power requirements for the at least one installed module to the external device;
means for receiving available power from the external power source;
means for reconfiguring the installed module to conform with the available power from the external power source; and
means for communicating the power requirement for the reconfigured installed module to the external power source.

11. An apparatus, comprising:
a line side configured to receive power from an external power source;
a first circuit on the line side configured to send a first signal to at least one installed module;
an isolated side isolated from the line side, wherein the at least one module is located at the isolated side;
a second circuit on the isolated side;
an isolation barrier between the line side and the isolated side to provide isolation between the line side and isolated side, the isolation barrier further comprising an optical link coupling the first circuit to the second circuit;
wherein the first circuit is configured to send the first signal across the isolation barrier to the isolated side
wherein the first circuit is configured to determine a power requirement for the at least one installed module based upon a response to the first signal; and
wherein the first circuit is responsive to determining the power requirement for the at least one installed module to send a second signal to the external power source, the second signal comprises data representative of the power requirement.

12. An apparatus according to claim 11, wherein the first circuit is configured to receive data representative of available power from the external power source, the first circuit being responsive to receiving the data representative of available power to communicate the data representative of available power to the second circuit via the optical link.

13. An apparatus according to claim 12, wherein the second circuit is responsive to receiving the data representative of available power to reconfigure the installed module to operate within the available power.

14. An apparatus according to claim 13, wherein the second circuit communicates the power requirement for the reconfigured installed module to the first circuit via the optical link.

* * * * *